(12) United States Patent
Meyer et al.

(10) Patent No.: US 10,175,263 B2
(45) Date of Patent: Jan. 8, 2019

(54) SAMPLE VESSEL RETENTION STRUCTURE FOR SCANNING PROBE MICROSCOPE

(71) Applicant: Bruker Nano, Inc., Tuscon, AZ (US)

(72) Inventors: Charles Meyer, Goleta, CA (US); Shuiqing Hu, Goleta, CA (US); James Shaw, Goleta, CA (US); Chanmin Su, Ventura, CA (US)

(73) Assignee: Bruker Nano, Inc., Tucson, AZ (US)

( * ) Notice: Subject to any disclaimer, the term of this patent is extended or adjusted under 35 U.S.C. 154(b) by 0 days.

(21) Appl. No.: 15/739,094

(22) PCT Filed: Jun. 15, 2016

(86) PCT No.: PCT/US2016/037496
§ 371 (c)(1),
(2) Date: Dec. 21, 2017

(87) PCT Pub. No.: WO2016/209673
PCT Pub. Date: Dec. 29, 2016

(65) Prior Publication Data
US 2018/0188286 A1 Jul. 5, 2018

Related U.S. Application Data

(60) Provisional application No. 62/184,779, filed on Jun. 25, 2015.

(51) Int. Cl.
*G02B 21/02* (2006.01)
*G01Q 30/14* (2010.01)
(Continued)

(52) U.S. Cl.
CPC .......... *G01Q 30/025* (2013.01); *G01Q 30/18* (2013.01); *G01Q 30/20* (2013.01); *G02B 21/02* (2013.01);
(Continued)

(58) Field of Classification Search
CPC ......... G02B 21/02; G01C 30/14; G01C 30/16
See application file for complete search history.

(56) References Cited

U.S. PATENT DOCUMENTS

| 4,436,385 A | 3/1984 | Fischer et al. |
| 4,508,435 A | 4/1985 | Graham et al. |

(Continued)

OTHER PUBLICATIONS

International Search Report for corresponding International Application No. PCT/US2016/037496 dated Sep. 16, 2016; 2 pages.
(Continued)

*Primary Examiner* — Nicole Ippolito
*Assistant Examiner* — Sean Luck
(74) *Attorney, Agent, or Firm* — Patterson Thuente Pedersen, P.A.

(57) ABSTRACT

A sample vessel retention mechanism for an inverted microscope having an optical objective and a scanning probe microscope (SPM) head. The inverted microscope includes a platform for supporting a sample vessel, in which is formed an aperture sized to provide a passage for the objective of the inverted microscope to approach the sample vessel from below. The retention mechanism provides a vacuum region formed in the platform, with the vacuum region being barometrically coupled with a vacuum generator. Establishment of a vacuum in the vacuum region prevents or substantially reduces oscillation of the sample vessel floor in an operating frequency range of the SPM head.

23 Claims, 12 Drawing Sheets

(51) Int. Cl.
*G01Q 30/16* (2010.01)
*G01Q 30/02* (2010.01)
*G01Q 30/20* (2010.01)
*G02B 21/26* (2006.01)
*G01Q 30/18* (2010.01)

(52) U.S. Cl.
CPC ............. *G02B 21/26* (2013.01); *G01Q 30/14* (2013.01); *G01Q 30/16* (2013.01)

(56) References Cited

U.S. PATENT DOCUMENTS

| | | |
|---|---|---|
| 5,675,154 A | 10/1997 | Lindsay et al. |
| 6,057,546 A | 5/2000 | Bruanstein et al. |
| 6,178,813 B1 | 1/2001 | Bruno et al. |
| 2008/0229812 A1 | 9/2008 | Hund et al. |
| 2011/0131690 A1 | 6/2011 | Novak et al. |
| 2013/0099740 A1 | 4/2013 | Takashima et al. |

OTHER PUBLICATIONS

Written Opinion of the International Searching Authority for corresponding International Application No. PCT/US2016/037496 dated Sep. 16, 2016; 4 pages.

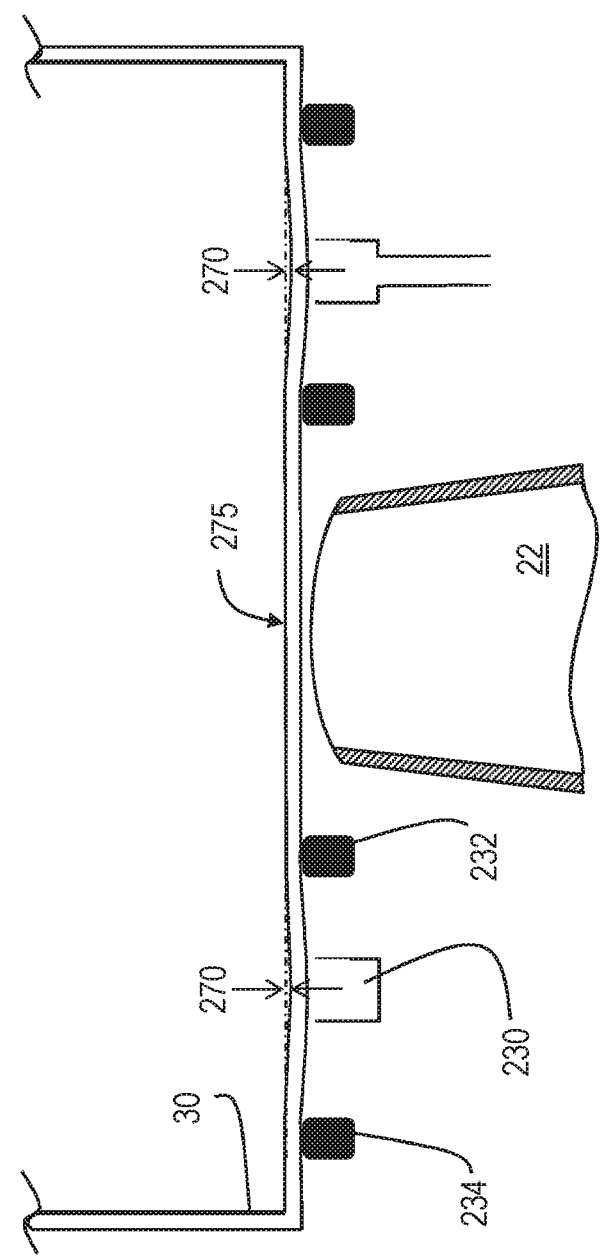

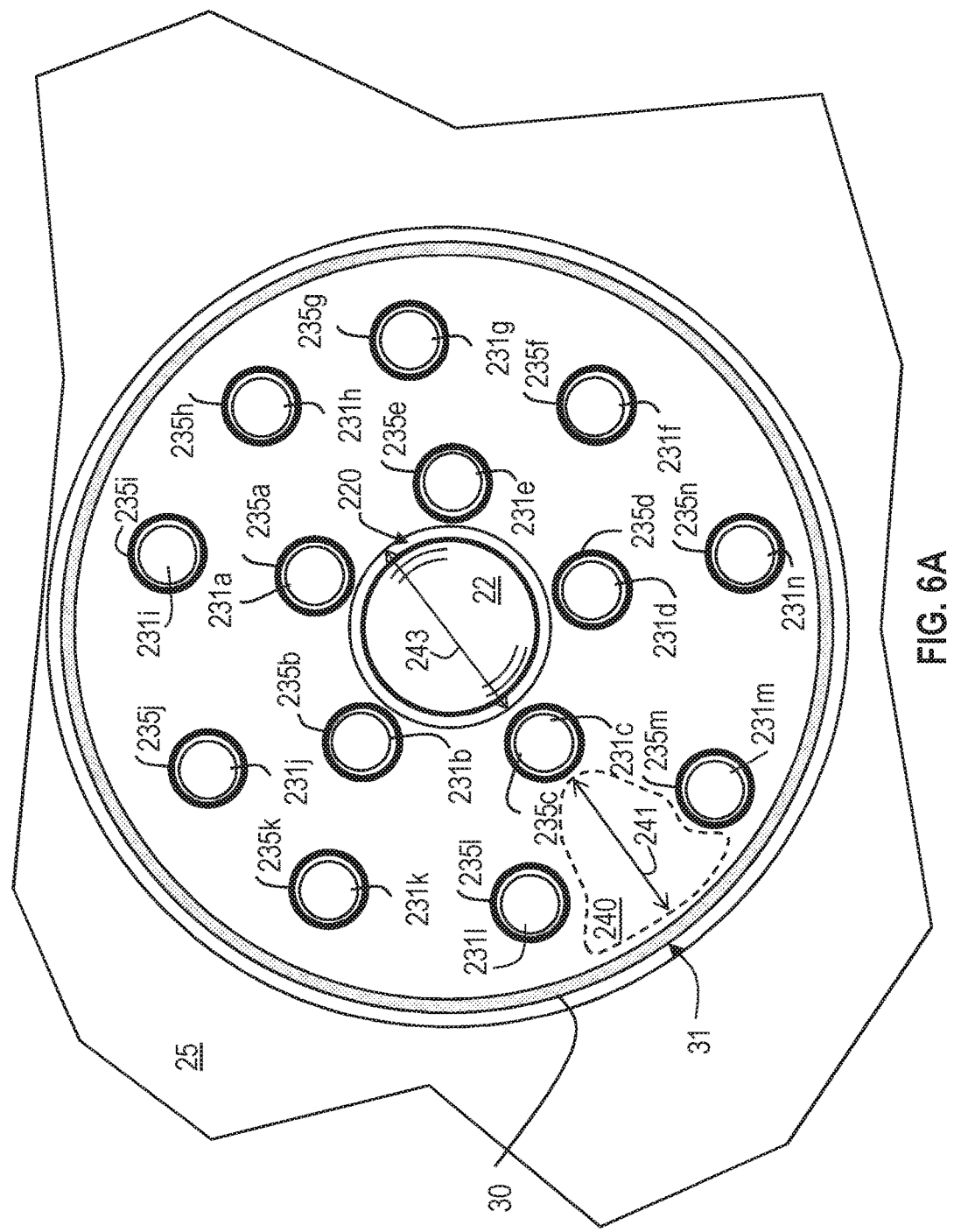

SAMPLE VESSEL RETENTION STRUCTURE FOR SCANNING PROBE MICROSCOPE

CROSS-REFERENCE TO RELATED APPLICATIONS

The present application is a National Phase entry of PCT Application No. PCT/US2016/037496, filed on Jun. 15, 2016, which claims priority to US Provisional Patent Application Ser. No. 62/184,779, filed on Jun. 25, 2015, which are hereby fully incorporated herein by reference.

FIELD OF THE INVENTION

The present invention relates generally to scanning probe microscopy and, more particularly, to a mechanism for retaining a sample vessel, such as a petri dish, for use with an inverting microscope having a scanning probe microscopy module.

BACKGROUND OF THE INVENTION

The use of inverted microscopes is ubiquitous in the life sciences and other fields that call for inspection of a sample in a liquid setting, in vitro. An inverted microscope views a sample through the bottom of a sample-containing vessel, such as a petri dish. The optical path includes an objective positioned beneath the vessel. To provide optimal optical properties, the sample vessel is constructed from a high-clarity material, usually glass, and the bottom of the vessel through which the sample is viewed is typically made as thin as practicable, oftentimes on the order of 170 micrometers. This is done for several reasons, first, a thin bottom of the vessel is made thin to allow the use of high numeric apertures in the inverted microscope's optics, which in turn have very short working distance, requiring the objective to be placed very close to the sample sitting at the bottom of the vessel. Also, a thin vessel bottom supports the use of fluorescence in observing the sample. Since glass naturally absorbs ultraviolet wavelengths, making the vessel bottom very thin facilitates improved transmission of these wavelengths from the sample to the objective.

Over the last 20 or so years, atomic force microscope (AFM) modules have been added to inverted microscopes to add AFM functionality. An AFM module is also referred to herein as an AFM head. An AFM is a type of microscope that "feels" a sample using a micro-fabricated probe tip mounted at the end of a cantilever microstructure. An AFM is able to view a sample at the nanoscale. The term nanoscale in the present context refers to a size of less than one micrometer. Modern-day high-performing AFMs can image and manipulate a sample with sub-nanometer resolution. With AFM technology, samples can be studied at the molecular, and sometimes even at the atomic, scale, which provides exceptional insight into such structures as cell membranes, DNA structures, and the like. Other relevant advantages provided by AFMs is their ability to measure the height of an object to produce a 3-dimensional image, to examine mechanical properties of the sample, and to manipulate the sample at the nanoscale.

In the operation of an AFM head, the probe tip is brought in close proximity to a surface of the sample such that the probe tip interacts with the sample through Van der Waals, capillary, electrostatic, and other forces that are significant at the nanoscale. The probe is scanned over the surface of the sample, while the deflection of the cantilever is observed and used as an input into a control system that continuously adjusts the height of the AFM probe to follow the topography of the sample. Scanning the sample with the AFM probe in this manner while recording the lateral coordinates (x, y), and the vertical coordinate (z) of the probe produces a three-dimensional image of the sample. An example of one such AFM is described in U.S. Pat. No. 6,057,546, the disclosure of which is incorporated by reference herein.

One long-felt problem experienced with the use of AFM heads in inverting microscopes in particular is the high-level of noise present in the AFM images. In the past, this problem has been addressed by slowing down the speed of the AFM scanning to operate the instrument in a stable regime. As such, the time needed to acquire an image of even a very small area of the sample has been on the order of 20 minutes or more. Such prolonged scan times severely limit the use of AFM heads, particularly for live samples such as bacteria or other microbes.

Another approach used to address the noise problem is eliminating the use of petri dishes altogether, using instead a smaller, slide-like vessel customized for the particular AFM instrument. This approach is not desirable because many users of inverted microscopes prefer the convenience of using standard petri dishes as the sample container.

A solution is therefore needed to improve AFM instruments, particularly their utilization in conjunction with inverted microscopes and petri dish sample vessels, to address the noise encountered in such applications.

SUMMARY OF THE INVENTION

Aspects of the invention provide a sample vessel retention mechanism for an inverted microscope. The inverted microscope has an optical objective and a scanning probe microscope (SPM) head. The sample vessel retention mechanism includes a platform for supporting a sample vessel, and an aperture formed in the platform. The platform provides a surface above which a sample vessel is situated during operation of the SPM head. The aperture is sized to provide a passage for the objective of the inverted microscope to approach the sample vessel from below.

The SPM head operably produces a controlled motion of the SPM probe utilizing a control system, the controlled motion tracking the sample surface within an operating bandwidth, the sample vessel retention mechanism comprising:

In one embodiment, the sample retention mechanism includes at least one vacuum region having a boundary that includes a floor of the sample vessel and the surface of the platform, each of the at least one vacuum region being barometrically coupled with a vacuum generator to facilitate a working vacuum within that vacuum region by operation of the vacuum generator. The at least one vacuum region includes at least a portion situated substantially proximate the aperture, such that, during operation of the SPM head producing the motion, the working vacuum causes the floor of the sample vessel to be substantially isolated from any acoustic excitation within the operating bandwidth resulting from the controlled motion of the SPM probe.

In a related embodiment, the vacuum region is formed in the platform that includes a recess formed in the surface of the platform and oriented proximately around the aperture. The vacuum region is barometrically coupled with a vacuum generator. The vacuum region includes an inner seal situated proximately to the aperture and a distal seal situated distally relative to the aperture. The inner and the distal seals are each arranged to maintain intimate contact with a floor of the sample vessel to enclose the vacuum region and to facilitate a working vacuum within the vacuum region by operation of the vacuum generator.

In another related embodiment, the at least one vacuum region includes a plurality of vacuum channels formed in the platform, including a first set of vacuum channels situated substantially proximate the aperture. The at least one vacuum region can further include a second set of vacuum channels having a maximum spacing between neighboring vacuum channels and a periphery of the sample vessel, the maximum spacing being smaller than the diameter of the aperture.

Advantageously, during the operation of the SPM head, establishment of the working vacuum can cause a resonant frequency of the sample vessel floor to be higher than the operating frequency range, thereby reducing noise in the SPM measurement.

BRIEF DESCRIPTION OF THE DRAWINGS

The invention may be more completely understood in consideration of the following detailed description of various embodiments of the invention in connection with the accompanying drawings, in which:

FIG. 5D is a partial cross-sectional view of the embodiment depicted in FIG. 4, with deformation of the petri dish floor shown illustratively in an operational state of the sample vessel retention mechanism according to one embodiment.

FIGS. 6A-6B are a top-view diagrams illustrating related embodiments in which there are a plurality of vacuum channels situated around the aperture formed in a sample vessel retention platform of an inverting microscope.

Figure 1:
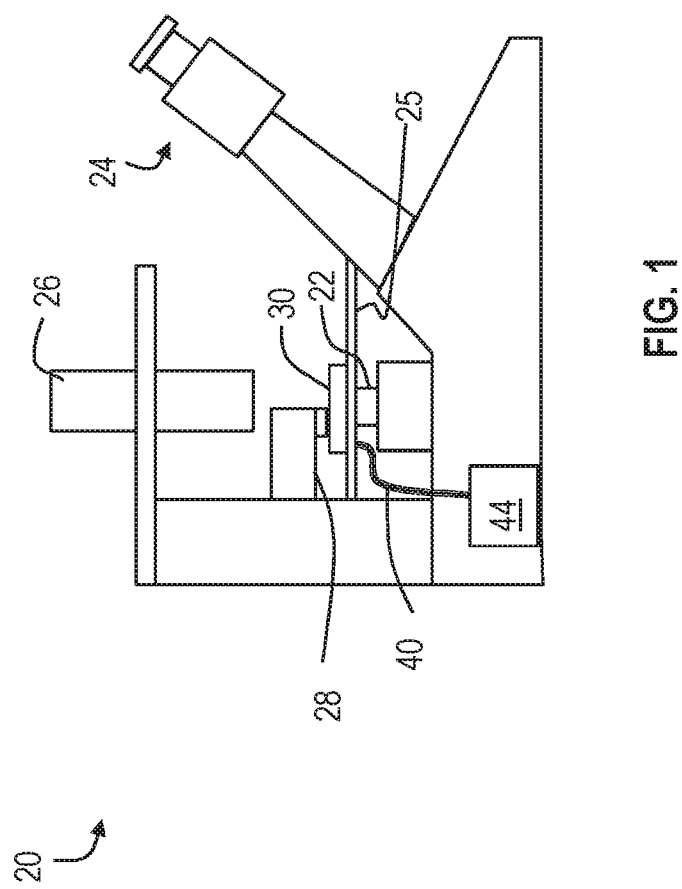
FIG. 1 is a schematic diagram illustrating an inverted microscope that includes both, an optical microscope portion, and a scanning probe microscope (SPM) portion, in which aspects of the invention are implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 is a schematic diagram illustrating an inverted microscope 20 that includes both, an optical microscope portion, and a scanning probe microscope (SPM) portion. The optical microscope portion is a conventional optical system that includes an objective lens 22, eyepiece optics 24, light and additional optics 26, and other conventional optical microscopy components, e.g., mirrors, lenses, zoom and focusing mechanics, beam splitters, fluorescence emission light source, etc., that are not shown here for the sake of clarity. The objective 22 is situated beneath the sample to be inspected.

The sample is contained in petri dish 30, which serves as the sample vessel. Petri dish 30 sits on platform 25, which is often referred to in the context of inverted microscopy as a stage. As will be described in greater detail below, platform 25 has an aperture through which the objective 22 can view the sample through the bottom of petri dish 30. In high-numerical-aperture objectives, the aperture is large enough to allow the objective 22 to approach the bottom of petri dish 30 at a distance that is less than the thickness of platform 25.

The SPM portion includes a SPM head 28, which is part of a greater SPM system shown in greater detail in FIG. 2 and described below. SPM head 28 includes SPM cantilever 102, probe 104, actuator 110, monitor 114, load isolator 124, additional mechanical systems 112, and a housing that is mounted to the frame of the inverted microscope 20. The other components of SPM system 100 depicted in FIG. 2 may be housed separately from SPM head 28, in which case they are electrically coupled to head 28 via suitable cabling. In other embodiments, various ones of these other components are sufficiently miniaturized so as to also be housed in the enclosure of SPM head 28.

As discussed above, in a conventional inverted microscope with a SPM head, as has been described thus far, a high amount of noise is observed in the SPM imaging. One particular source of noise, as recognized by the inventors, is the vibration of the floor of petri dish 30. More specifically, movement of the SPM probe in the course of scanning of the sample transmits mechanical forces to the floor of petri dish 30, causing the floor to vibrate like a drum head. This vibration, in turn, interacts with the sample and the SPM measurement, resulting in imaging noise.

According to one aspect of the invention, a mechanical retention mechanism is provided to rigidly secure the floor of petri dish 30 to platform 25. Notably, in the basic embodiment depicted in FIG. 1, petri dish 30 is secured to platform 25 using a vacuum-based retention mechanism particularized for operation with SPM heads in inverted microscopes. Accordingly, platform 25 has certain structural features that will be detailed below, which establish a vacuum region beneath petri dish 30. In the present context, the term vacuum includes a partial vacuum—i.e., a region having a pressure that is below the ambient pressure. The vacuum is established via vacuum line 40, which barometrically connects the vacuum region to vacuum generator 44, e.g., a vacuum pump.

Figure 2:
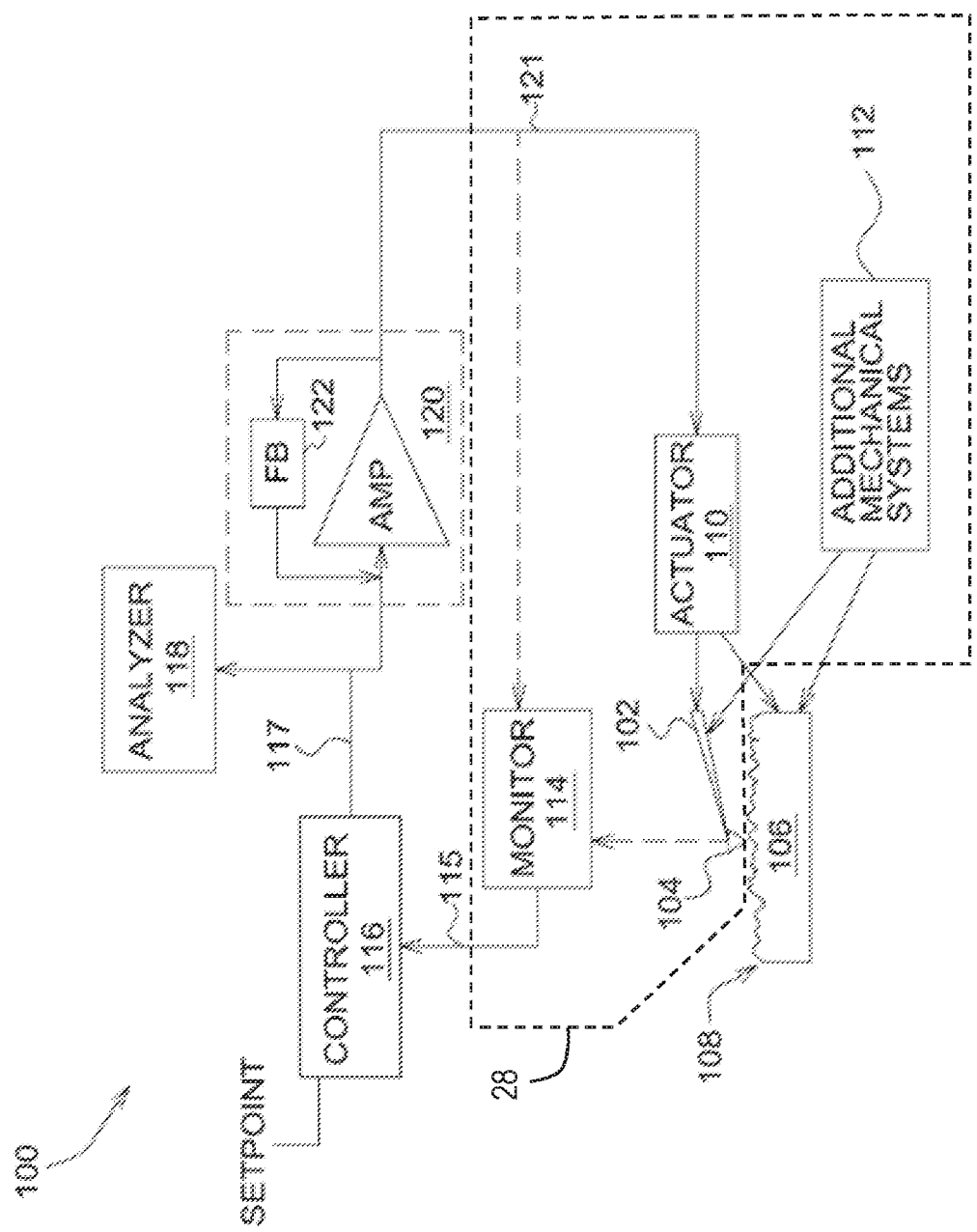
FIG. 2 is a block diagram illustrating a basic SPM system according to one embodiment that includes a SPM head that forms part of the SPM portion of the inverted microscope of FIG. 1.

FIG. 2 is a block diagram illustrating a basic SPM system 100, which includes SPM head 28. Cantilever 102 holds probe 104. Probe 104 is used to inspect sample 106 having surface 108. Sample 106 can be a biological sample housed in a petri dish, for example. Surface 108 has a certain topography, which is the subject of the inspection in certain applications. The term topography is defined herein as a representation of a three-dimensional profile of a sample or of a portion of a sample, including, but not limited to, surface features of a sample.

The inspection is accomplished by situating probe 104 relatively to surface 108 by moving cantilever 102 and probe 104 to the sample in order to establish a detectable interaction between surface 108 and probe 104. Probe 104 is scanned over or across the sample while probe 104 tracks the topography of sample 106, such as, for example, the topography of surface 108. Tracking of the topography includes, without limitation, following features present on the sample, such as, for example, cell membranes, molecular structures, and the like.

In one embodiment, as illustrated in FIG. 2, SPM system 100 includes an actuator subsystem in which actuator 110 adjusts the probe-sample interaction by moving cantilever 102 relative to surface 108 to produce a controlled motion of the probe 104. The controlled motion is controlled using a feedback loop, the operation of which is described in greater detail below.

In one embodiment, SPM system 100 is constructed such that the mechanical structure, including the couplings between probe 104 and sample 106, reduce or avoid damping, resonating, or otherwise interacting with the relative motion between the probe and the sample. For instance, actuator 110 may be rigidly mounted to a chassis to which petri dish 30 is also rigidly mounted.

Additional mechanical systems 112 may also be provided that would include actuators to move cantilever 102 or sample 106, or both, such that the relative motion of probe 104 and surface 108 is along surface 108. For simplicity, this motion shall be termed motion in the x-y directions or along the x- or y-axes. This motion in the x-y directions facilitates the scanning of probe 104 over surface 108. As probe 104 is scanned over sample 108, actuator 110 adjusts the relative positioning of cantilever 102 and surface 108 to produce motion along the z-axis to maintain a generally constant level of probe-sample interaction, which results in probe 104 tracking the topography of surface 108. In oscillating mode systems, the probe-sample interaction can be averaged over the oscillation cycle to produce a corresponding scalar representing the level of probe-sample interaction to be maintained as probe 104 is scanned over surface 108. In one type of embodiment, the actuators for the x, y and z axes are piezoelectric stacks. In related embodiments, the actuators can also employ any number of alternative actuation technologies, including but not limited to, other piezoelectric devices, actuators formed from electrostrictive, magnetorstrictive, electrostatic, inductive, and/or voice coil drive mechanisms and other actuators that generate a motion in response to an input signal.

The controlled motion of the probe 104 relative to sample 106 is responsive to a changing nanoscale interaction between the probe and the sample. Examples of types of nanoscale interaction include, without limitation, contact, tapping, electric force, magnetic force, friction, adhesion, near-field optical, thermal, Van der Waals, or other local forces and/or fields that are mapped on scales with resolution better than 1 um and typically less than 100 nm. As an example, the nanoscale interaction can change as a result of the probe encountering various topographic features of the sample as a scanning relative motion of the probe and the sample causes the probe to traverse the sample. The controlled relative motion of probe 104 and sample 106 can be perpendicular or oblique to surface 108, and can include translational or rotational motion components. The controlled motion has a broad operating bandwidth from zero to a maximum frequency corresponding to the fastest topography-tracking motion that the system can produce—generally limited by the mechanics of the actuator, cantilever, structural rigidity of the instrument, and the like.

The controlled, topography-tracking, motion of probe 104 is distinguishable from other types of motion of the probe that can be produced by the SPM system. For instance, an oscillating-mode motion may be imparted that causes the probe to rapidly oscillate in a "tapping mode" that oscillates between momentary greater interaction with the sample and momentary lesser interaction as the probe tip is tapped. This oscillatory motion occurs generally at a much higher frequency and with a very narrow bandwidth compared to the controlled motion, and is not controlled with the control system's feedback loop that adjusts the positioning of the probe relative to the sample.

The controlled motion of probe 104 is also distinguishable from a coarse positioning motion that is used to engage and disengage the probe from the sample and to shuttle the relative positioning of the probe and sample. This type of coarse motion provides a significantly greater displacement than the displacement corresponding the controlled (topography-tracking) motion, but is typically limited in its resolution along the z-axis and is thus not useful for tracking the sample topography at a practical scanning speed.

SPM system 100 has a feedback control system, including monitor 114 and controller 116 that controls the motion of the probe 104 to track surface 108. The probe-sample interaction is monitored by monitor 114. In one embodiment, monitor 114 utilizes an optical system in which a laser beam deflection system measures deflection of cantilever 102. In an oscillating mode embodiment, changes in the probe-sample interaction can be detected by observing a change in the oscillation characteristics, such as in a shift in phase offset or amplitude of the oscillation due to a change in resonance characteristics from the probe-sample interaction.

Monitor 114 produces signal 115 indicating the probe-sample interaction, and feeds signal 115 to controller 116, which compares it against a setpoint signal representing an amount of probe-sample interaction to be maintained. Controller 116 produces probe positioning signal 117, which is input to analyzer 118 as a representation of the topology of surface 108. In the embodiment depicted in FIG. 2, monitor 114 and controller 116 provide a feedback control topology. In other embodiments that are also supported within the scope and spirit of the invention, other types of control topologies are possible. For example, a feed forward control system, or a model-based control system, may be utilized.

Amplifier 120 amplifies probe positioning signal 117 to produce cantilever driving signal 121. In one example embodiment, amplifier 120 is implemented with discrete and integrated electrical/electronic components on a single circuit board. In other embodiments, the circuit of amplifier 120 spans a plurality of interconnected circuit boards, or a plurality of separate interconnected enclosures. Amplifier 120 includes an internal feedback network 122.

Figure 3:
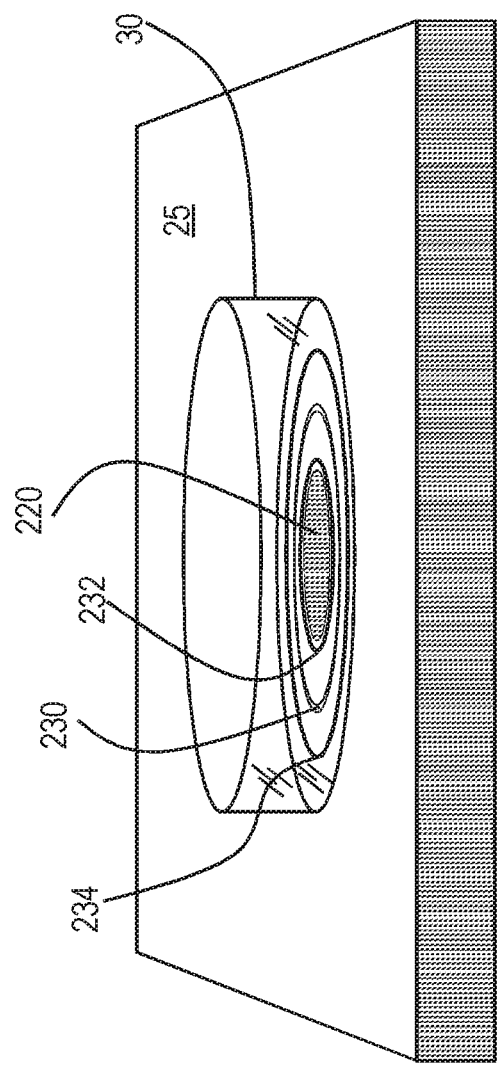
FIG. 3 is a perspective view diagram illustrating a portion of a sample retention platform forming a part of an inverted microscope according to one embodiment, on which a petri dish, shown schematically, is situated.

FIG. 3 is a perspective view diagram illustrating a portion of platform 25 according to one embodiment, on which petri dish 30, shown schematically, is situated. Aperture 220 is depicted, through which the objective 22 (not visible) has a line of sight to the sample in petri dish 30. Petri dish 30 is rigidly secured to platform 25 by a vacuum region formed therebetween. The vacuum is facilitated in this embodiment by vacuum channel 230, which is barometrically coupled to a vacuum generator, such as vacuum generator 44 (FIG. 1). The vacuum region is further defined by boundaries that isolate the vacuum region from the ambient environment. In the embodiment depicted, the boundaries include the bottom of petri dish 30, the body of platform 25, inner seal 232 situated in close proximity to aperture 220, and distal seal 234 situated distally relative to aperture 220.

In this particular embodiment, vacuum channel 230 is formed as a ring-shaped trench in the surface of platform 25. It will be understood that a variety of other shapes may be employed. Likewise, there may be a plurality of individual vacuum channels that are barometrically connected to the vacuum generator. For instance, another embodiment, detailed below, utilizes a plurality of bore holes through which the vacuum in the vacuum region is drawn.

Figure 4:
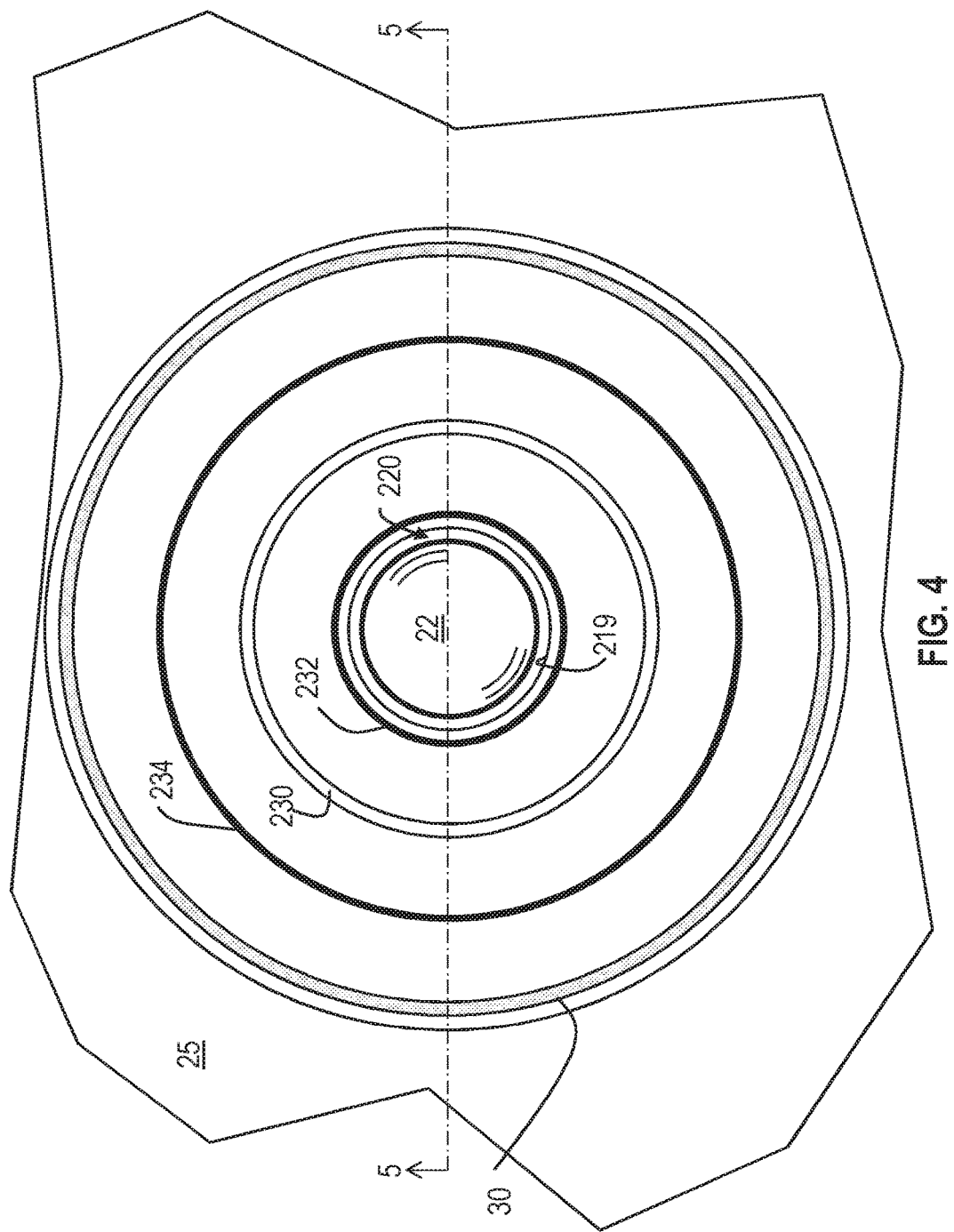
FIG. 4 is a top-view diagram of the platform portion and petri dish as depicted in FIG. 3.

FIG. 4 is a top-view diagram of the platform portion and petri dish as depicted in FIG. 3. This view shows aperture 220 having an interior surface 219, and objective 22 situated inside aperture 220. Inner seal 232 is situated near aperture 220. Outer seal 234 is arranged radially on the opposite side of vacuum channel 230. In this embodiment, the vacuum region has an annular cross-section.

FIGS. 5A-5D are cross-sectional view diagrams illustrating various embodiments as seen in section 5-5. In these embodiments, platform 25 includes an indentation 250 that forms a cylindrical pocket in which petri dish 30 is placed. Indentation 250 helps to center petri dish 30 over aperture 220. As can be seen in this view, objective 22 can fit, at least partially, into aperture 220 so as to approach the bottom of petri dish 30. Vacuum channel 230 is coupled to vacuum line 40 that leads to a vacuum generator, which draws vacuum 242.

Vacuum region 265 is bound by surfaces that are substantially isolated from induced vibration. "Substantially isolated" in the present context means an absence of any vibrations that are observable, as noise or otherwise, by operation of the SPM. Inner seal 232 advantageously creates a rigid, or semi-rigid boundary that isolates any vibrations induced by operation of SPM head 28 onto the un-bound bottom of petri dish 30, from vacuum region 265, by virtue of the vacuum pressure on the bottom of petri dish 30 resisting any induced motion of the petri dish bottom.

The interior surface of aperture 220 is at a distance r1 from central axis 260. As shown for reference, central axis 260 is situated along the optical axis of objective 22 (which in this example is perpendicular to platform 25) and passes through the aperture 220. Inner seal 232 is situated at a distance r2 from central axis 260. With the radial distance r2 being much smaller than the radius r4 of petri dish 30, the vibratory portion of the petri dish bottom that is subject to acoustic excitation from operation of the SPM head 28 is made substantially smaller. This reduction in the size of the vibrating diaphragm, or "drum head" effectively increases the resonant frequency of vibration to a point where any vibration of the petri dish bottom portion within radial distance r2 is negligible insofar as its observable effect on the noise of the SPM imaging is concerned.

Figure 5A:
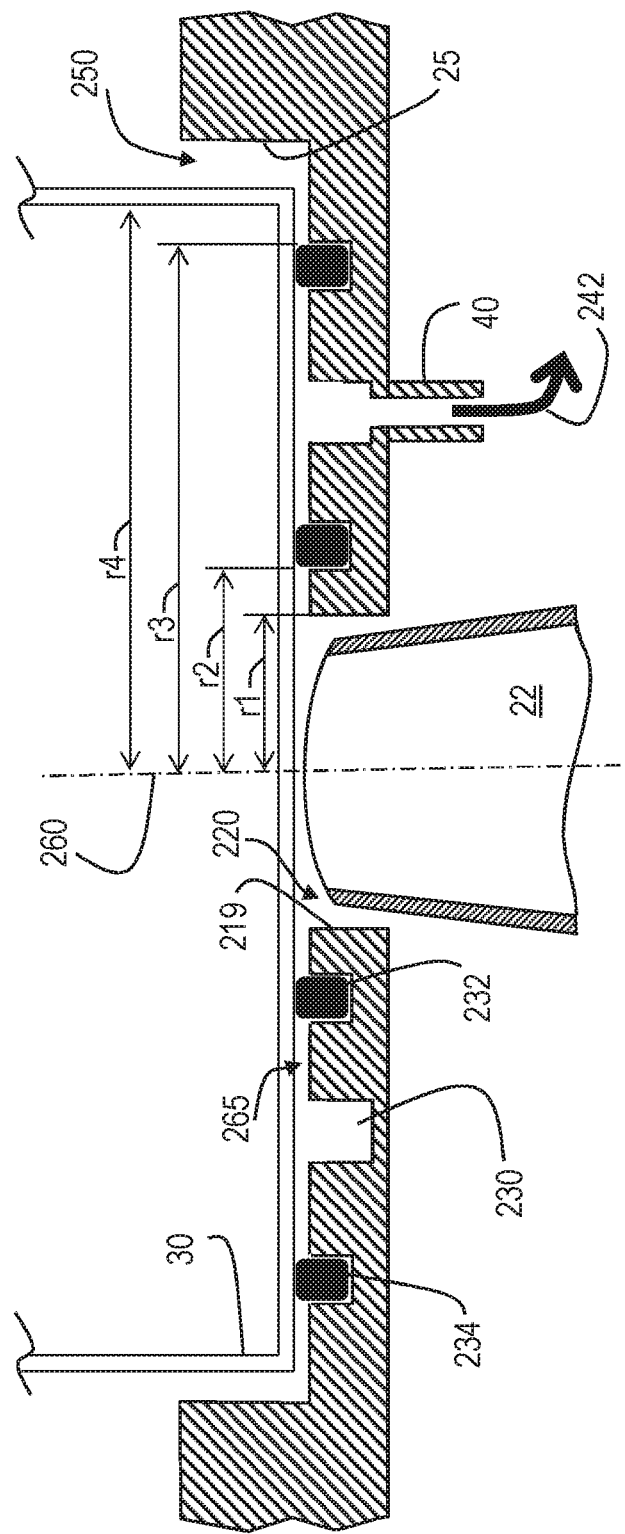
FIGS. 5A-5C are cross-sectional view diagrams illustrating various embodiments of a sample vessel retention mechanism as seen in section 5-5 indicated in FIG. 4.

In the embodiment depicted in FIG. 5A, inner seal 232 and distal seal 234 are each formed from an O-ring placed in a corresponding annular trench. Also, as depicted in FIG. 5A, inner seal 232 is situated at a distance r2, which is greater than distance r1, but the difference r2-r1 remains small, albeit non-zero. In one particular embodiment, distance r2-r1 is 50% of r2 or smaller. In another embodiment, distance r2-r1 is 20% of r2 or smaller. In still another embodiment, distance r2-r1 is 10% of r2 or smaller.

Radial distance r3 represents the distance to the exterior of distal seal 234 from central axis 260. Radial distance r4 represents the nominal radius of petri dish 30, which may have tapered walls. Vibrations induced in the petri dish floor beyond radial distance r3 may be isolated by vacuum region 265 from where the SPM probe 104 operates; however, these vibrations can be coupled to the sample through the fluid in the petri dish. Accordingly, in one embodiment, the distal seal 234 is situated such that distance r4-r3 is minimal. In this context, a minimal distance r4-r3 is one in which vibrations of any part of the petri dish beyond distance r3 produce no more than a negligible effect on the SPM measurement. According to one particular implementation, radial distance r3 is at least 90% of radial distance r4. In another embodiment, radial distance r3 is at least 95% of radial distance r4.

In a related embodiment, vacuum region 265 is arranged such that each region of the petri dish floor that does not constitute a boundary of vacuum region 265 is smaller in area than the portion of the petri dish floor over objective 22 and inside radius r2.

Figure 5B:
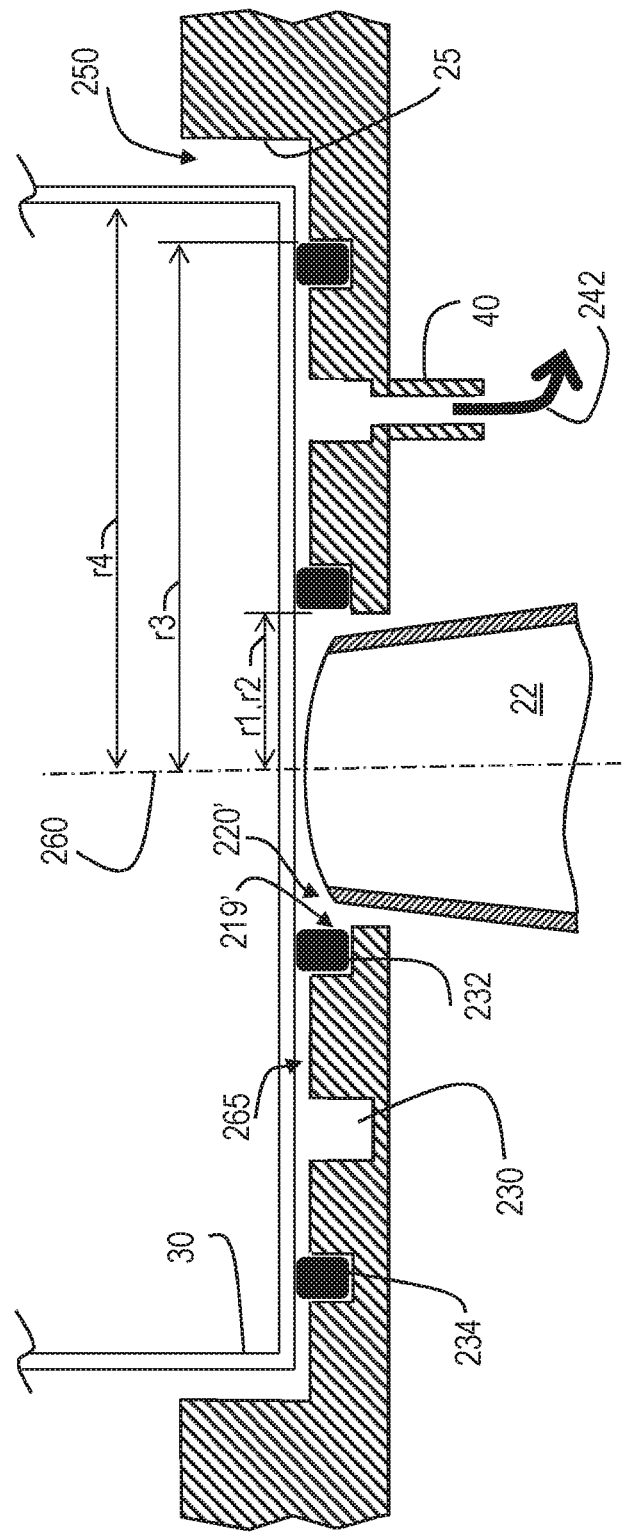

In the embodiment depicted in FIG. 5B, the interior surface 219' of aperture 220' includes an indentation to accommodate inner seal 232. Here, the distances r1 and r2 are the same or not appreciably different. This embodiment offers an advantage of a further reduced area of the petri dish bottom that is subject to induced vibration.

Figure 5C:
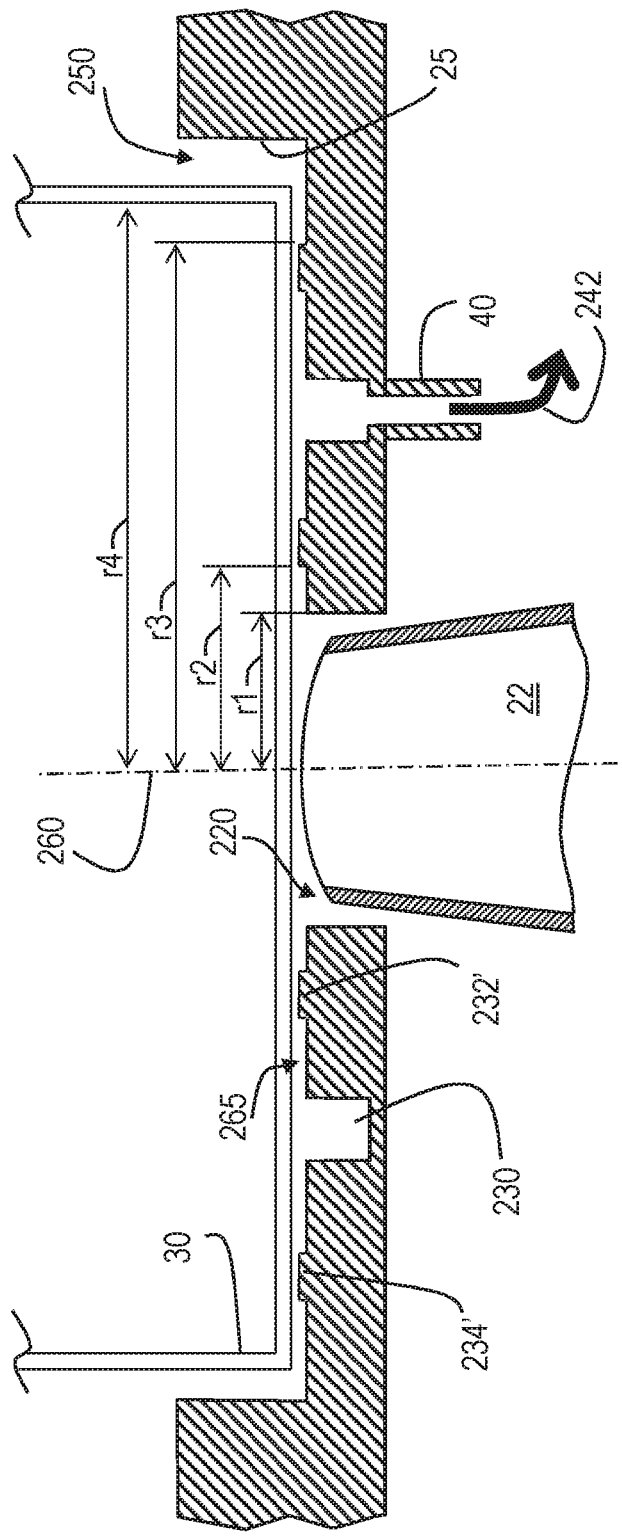

The embodiment depicted in FIG. 5C is similar to the embodiment of FIG. 5A, except that inner seal 232' and distal seal 234' are each formed from the body of platform 25. In this embodiment, seals 232' and 234' are machined protrusions that have a smooth upper surface that interfaces with the bottom of petri dish 30 sufficiently intimately to facilitate the establishment and maintaining of vacuum 242.

FIG. 5D is a partial cross-sectional view of the embodiment depicted in FIGS. 4 and 5A, with various elements omitted for the sake of clarity. Here, the bottom surface of petri dish 30 is depicted as being deformed due to application of the vacuum. Over the vacuum regions, the petri dish bottom is deformed downwards as indicated with reference numeral 270 (the extent of deformation is exaggerated for illustrative purposes). Advantageously, inner and distal seals 232 and 234, respectively, are situated in a balanced arrangement relative to petri dish 30 such that any deformation in the petri dish floor portion situated over objective 22, and beneath the SPM probe 40, is negligible. Reducing this deformation is advantageous to reduce any optical distortion such deformation may cause for viewing the sample via objective 22.

FIG. 6A is a top-view diagram illustrating a related embodiment in which there are a plurality of vacuum channels situated around aperture 220. As shown, each vacuum channel 231a-231n is circular. However, it will be appreciated that any shape may be used—elliptical, arcuate, etc. Each vacuum channel is bound by a corresponding seal 235a-235n, and is positioned proximately to aperture 220. Each seal 235 can be in the form of an O-ring, gasket, or other suitable insert, or can be a suitably-prepared surface such as a smooth and level machined surface, according to various embodiments. When petri dish 30 is placed on platform 25, those portions of the petri dish floor that are situated on a vacuum channel 231 form a vacuum region boundary and is isolated from vibration due to acoustic coupling of the SPM probe's motion.

In the embodiment depicted, vacuum channels 231 are distributed to meet two criteria: (1) a plurality of vacuum channels, 231a-231e, are positioned substantially proximate to aperture 220 in order to minimize the area of the petri dish bottom in the center of the petri dish that does not constitute a boundary of a vacuum region (therefore reducing, or minimizing, the effective vibratory "diaphragm" or "drum head" in the center of the petri dish); and (2) the plurality of vacuum channels include additional vacuum channels positioned to limit the size of other surface regions of the petri dish floor such that any induced vibrations in those regions are negligible insofar as their effect on the SPM measurement is concerned. The latter is accomplished by spacing the vacuum channels relative to one another and relative to the periphery of the petri dish floor such that the largest dimension of any surface region of the petri dish floor not constituting a vacuum region boundary is smaller than the diameter of aperture 220. As illustrated, region 240 is situated between neighboring vacuum channels 231c, 231l, and 231m, and the petri dish periphery. The largest dimension of non-vacuum-boundary region 240 is linear dimension 241, which according to the layout of vacuum channels is smaller that diameter 243 of aperture 220. In a related embodiment, the longest distance between any vacuum channel 231 and its neighboring vacuum channel is less than the diameter 243 of aperture 220.

Figure 6B:
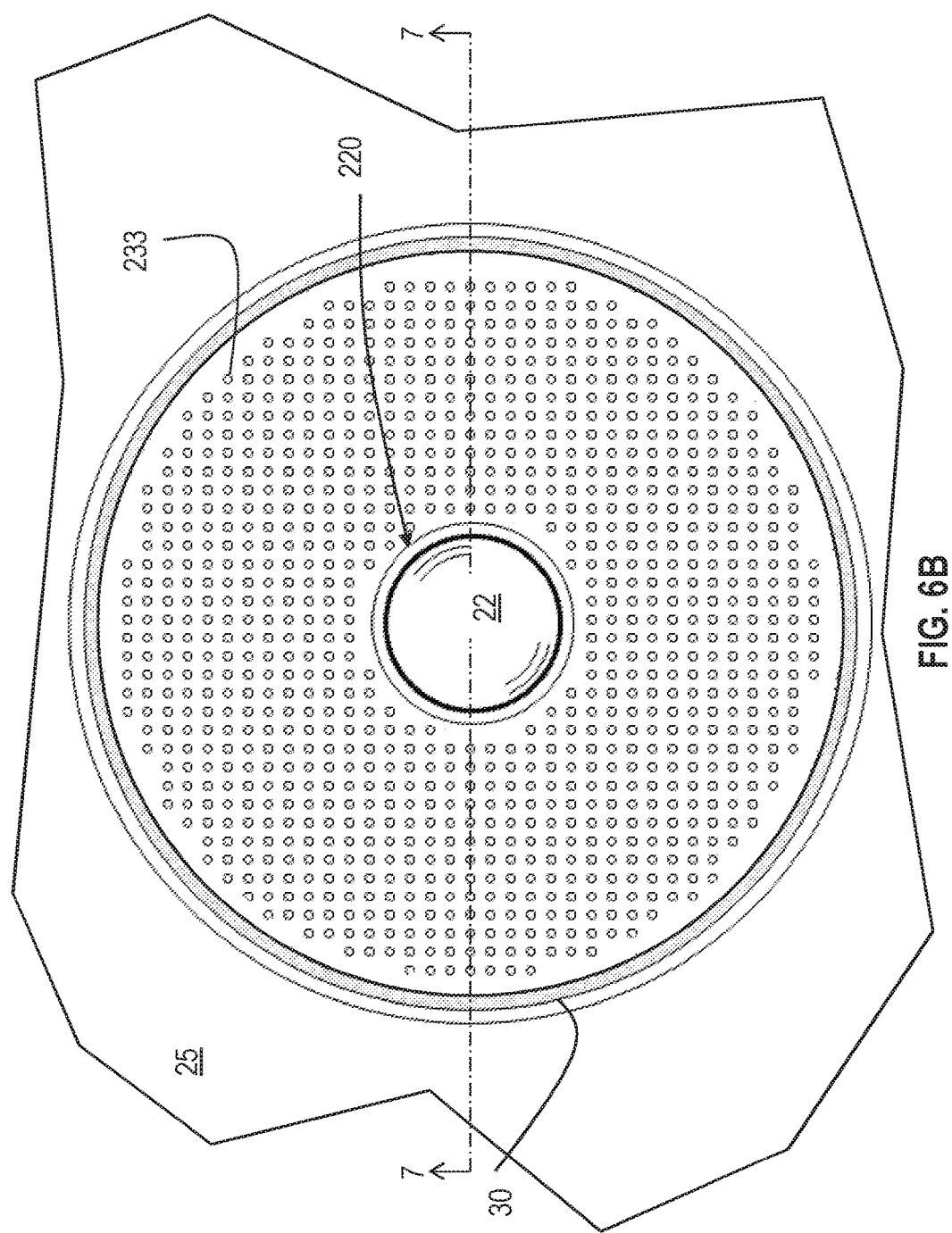

FIG. 6B is a top-view diagram illustrating another related embodiment with a large plurality of vacuum channels 233 are situated around aperture 220. Each of the vacuum channels 233 terminates at the floor of petri dish 30, and the vacuum interfaces with the petri dish floor throughout its exterior surface, causing intimate contact of the petri dish floor against platform 25. In this embodiment, criteria (1) and (2) are also met.

Figure 7:
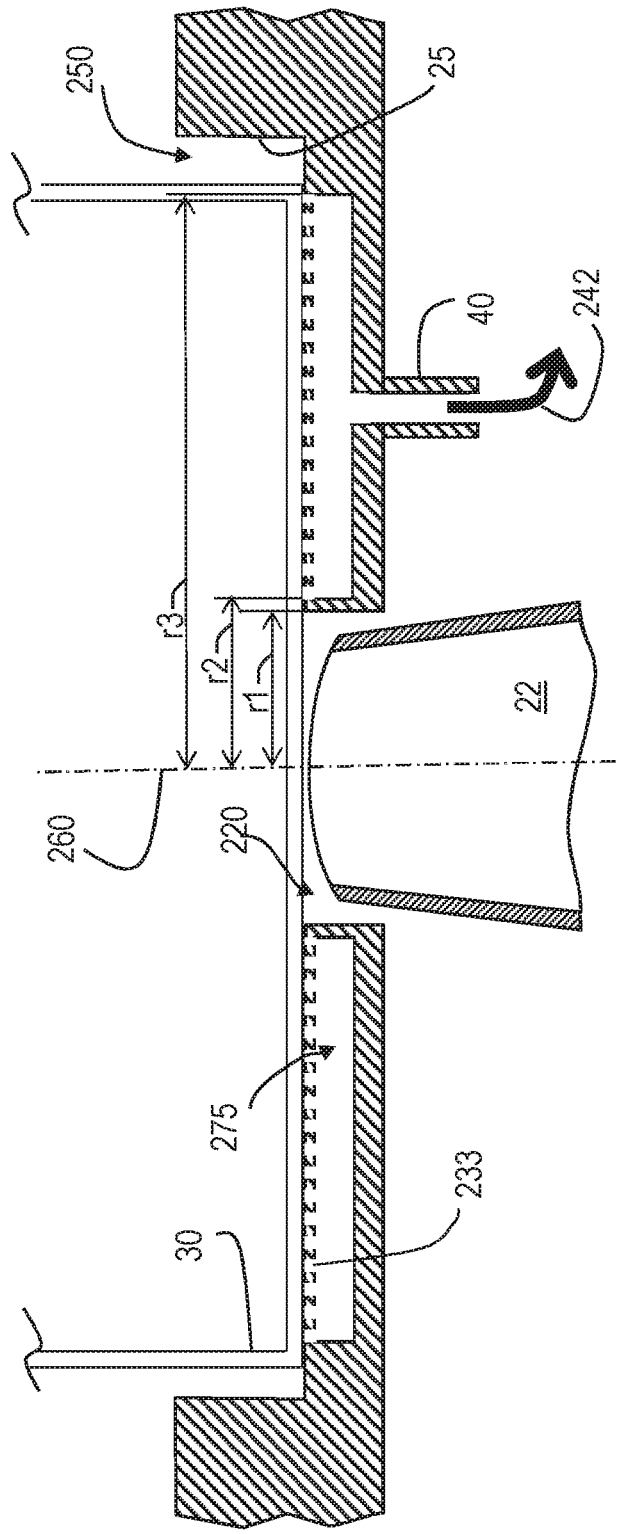
FIG. 7 is a cross-sectional view of the embodiment depicted in FIG. 6B, as seen in section 7-7.

FIG. 7 is a cross-sectional view depicting the embodiment illustrated in FIG. 6B. Each one of vacuum channels 233 leads to vacuum chamber 275, which is buried below the surface of platform 25 on which petri dish 30 sits. Vacuum chamber 275 is coupled with vacuum line 40, leading to vacuum generator 242.

Figure 8:
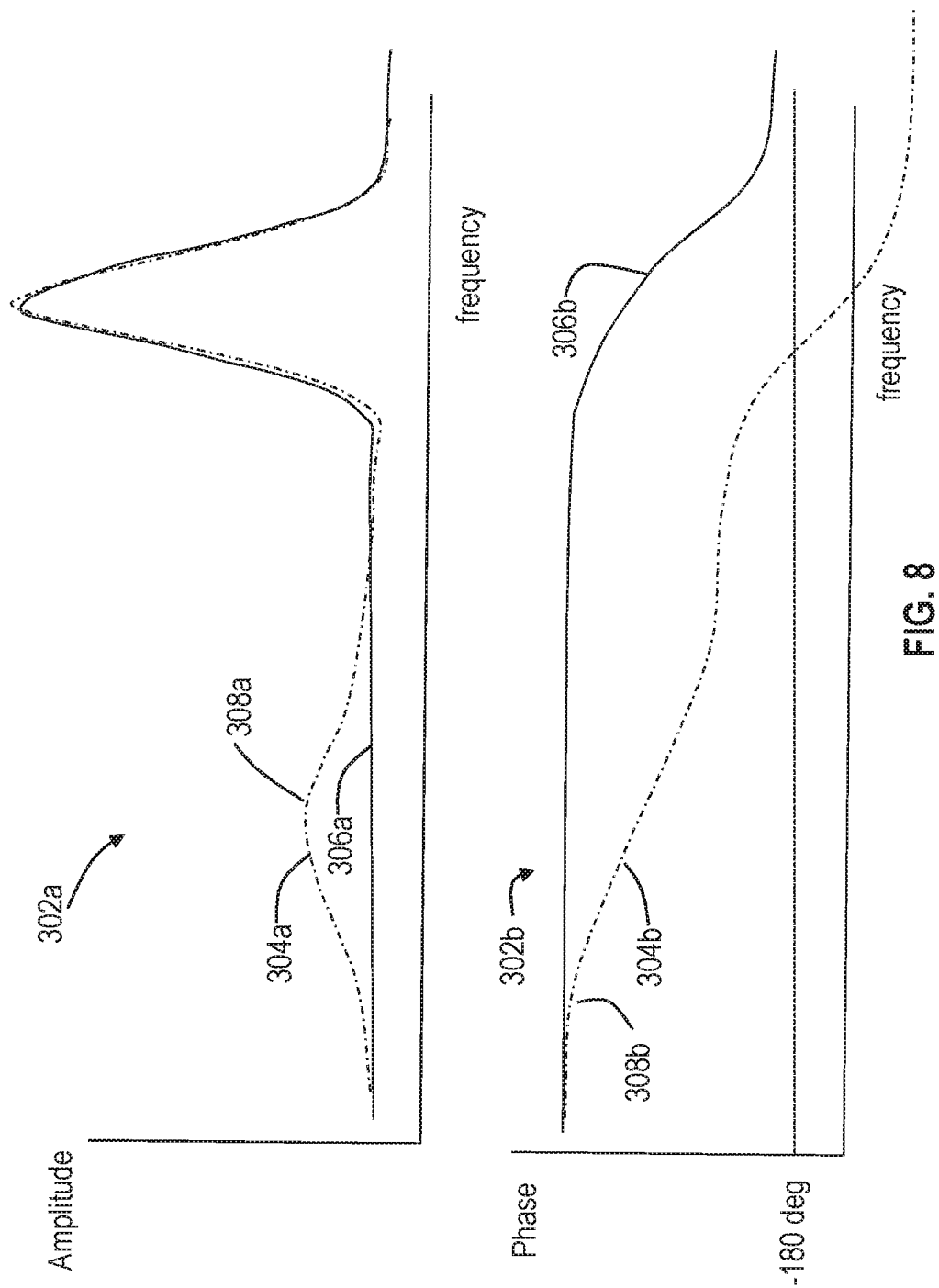
FIG. 8 illustrates comparative amplitude and phase spectra of the transfer function of the SPM head with, and without, the sample vessel retention arrangement described herein according to various embodiments.

FIG. 8 illustrates an amplitude spectrum 302a and phase spectrum 302b of the transfer function of SPM head 28 with, and without, the petri dish retention arrangement described above. Curves 304a and 304b relate to the conventional arrangement that lacks the petri dish retention features according to aspects of the invention; curves 306a and 306b relate to the improved system incorporating a vacuum region to secure petri dish 30 to platform 25. Amplitude spectrum curve 304a has a pronounced peak 308a attributable to a resonance of the petri dish floor. Phase spectrum curve 304b has a phase shift 308b corresponding to peak 308a. The phase shift 308b results in a loss of phase margin, which limits the stability of the transfer function to much lower operating frequencies than what can be achieved with the improved system utilizing the petri dish retention solution.

The embodiments detailed above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A sample vessel retention mechanism for an inverted microscope having an optical objective and a scanning probe microscope (SPM) head that includes a SPM probe and control system configured to perform scanning of a sample in the sample vessel, the SPM head operably producing a controlled motion of the SPM probe utilizing a control system, the controlled motion tracking the sample surface within an operating bandwidth, the sample vessel retention mechanism comprising:
    a platform for supporting a sample vessel, the platform providing a surface above which a sample vessel is situated during operation of the SPM head;
    an aperture formed in the platform, the aperture being sized to provide a passage for the objective of the inverted microscope to approach the sample vessel from below; and
    at least one vacuum region having a boundary that includes a floor of the sample vessel and the surface of the platform, each of the at least one vacuum region being barometrically coupled with a vacuum generator to facilitate a working vacuum within that vacuum region by operation of the vacuum generator;
    wherein the at least one vacuum region includes at least a portion situated substantially proximate the aperture, such that, during operation of the SPM head producing the motion, the working vacuum causes the floor of the sample vessel to be substantially isolated from any acoustic excitation within the operating bandwidth resulting from the controlled motion of the SPM probe.

2. The sample vessel retention mechanism of claim 1, wherein the at least one vacuum region includes an inner seal situated proximately to the aperture and a distal seal situated distally relative to the aperture, the inner and the distal seals each being arranged to maintain intimate contact with the floor of the sample vessel to enclose the vacuum region.

3. The sample vessel retention mechanism of claim 2, wherein the at least one vacuum region is a single vacuum region that has an annular cross-section in a reference plane parallel to the surface.

4. The sample vessel retention mechanism of claim 2, wherein each of the at least one vacuum region includes a vacuum channel having an annular cross-section in a reference plane parallel to the surface.

5. The sample vessel retention mechanism of claim 2, wherein at least one of the inner seal and the distal seal includes an O-ring.

6. The sample vessel retention mechanism of claim 2, wherein at least one of the inner seal and the distal seal includes an machined surface formed on the platform.

7. The sample vessel retention mechanism of claim 2, wherein the distal seal includes a single continuous seal.

8. The sample vessel retention mechanism of claim 2, wherein the inner seal is situated at a fixed radial distance from a reference central axis passing through the center of the aperture and oriented along an optical axis of the objective.

9. The sample vessel retention mechanism of claim 2, wherein the inner seal is situated at a maximum radial distance from a reference central axis passing through the center of the aperture and oriented along an optical axis of the objective, the maximum radial distance being no greater than one-half of the radius of the aperture.

10. The sample vessel retention mechanism of claim 2, wherein the inner seal is situated at a maximum radial distance from a reference central axis passing through the center of the aperture and oriented along an optical axis of the objective, the maximum radial distance being no greater than 20 percent of the radius of the aperture.

11. The sample vessel retention mechanism of claim 2, wherein the inner seal is situated at a maximum radial distance from a reference central axis passing through the center of the aperture and oriented along an optical axis of the objective, the maximum radial distance being no greater than 10 percent of the radius of the aperture.

12. The sample vessel retention mechanism of claim 2, wherein the inner seal is aligned with a radius of the aperture relative to a reference central axis passing through the center of the aperture and oriented along an optical axis of the objective.

13. The sample vessel retention mechanism of claim 2, wherein the distal seal is situated at a fixed radial distance from a reference central axis passing through the center of the aperture and oriented along an optical axis of the objective.

14. The sample vessel retention mechanism of claim 2, wherein the distal seal is situated at a minimum radial distance from a reference central axis passing through the center of the aperture and oriented along an optical axis of the objective, the minimum radial distance being at least 90 percent of the radius of the sample vessel.

15. The sample vessel retention mechanism of claim 1, wherein the platform is arranged such that the sample vessel floor includes at least one portion that is not a vacuum region boundary, each of the at least one portion being smaller in area than the aperture.

16. The sample vessel retention mechanism of claim 1, wherein the at least one vacuum region includes a plurality of vacuum channels formed in the platform, including a first set of vacuum channels situated substantially proximate the aperture.

17. The sample vessel retention mechanism of claim 16, wherein the at least one vacuum region further includes a second set of vacuum channels having a maximum spacing between neighboring vacuum channels and a periphery of the sample vessel, the maximum spacing being smaller than the diameter of the aperture.

18. The sample vessel retention mechanism of claim 1, wherein the at least one vacuum region includes a plurality of vacuum channels formed in the platform and spaced apart from one another by a distance that is smaller than the diameter of the aperture.

19. The sample vessel retention mechanism of claim 1, wherein during the operation of the SPM head, establishment of the working vacuum causes a resonant frequency of the sample vessel floor to be higher than the operating bandwidth of the controlled motion of the SPM probe.

20. The sample vessel retention mechanism of claim 1, wherein the sample vessel is a petri dish.

21. The sample vessel retention mechanism of claim 1, wherein the objective of the inverted microscope has a numerical aperture greater than 0.2.

22. The sample vessel retention mechanism of claim 1, wherein the objective of the inverted microscope has a numerical aperture greater than 0.5.

23. An inverted microscope comprising:
an optical objective;
a scanning probe microscope (SPM) head that includes a SPM probe configured to perform scanning of a sample in a sample vessel, the SPM probe operably producing motion having an oscillatory component at an operating frequency range;
a sample vessel retention mechanism that includes:
a platform for supporting a sample vessel, the platform providing a surface above which a sample vessel is situated during operation of the SPM head;
an aperture formed in the platform, the aperture being sized to provide a passage for the objective of the inverted microscope to approach the sample vessel from below; and
at least one vacuum region having a boundary that includes a floor of the sample vessel and the surface of the platform, each of the at least one vacuum region being barometrically coupled with a vacuum generator to facilitate a working vacuum within that vacuum region by operation of the vacuum generator;
wherein the at least one vacuum region includes at least a portion situated substantially proximate the aperture, such that, during operation of the SPM head producing the motion, the working vacuum causes the floor of the sample vessel to be substantially isolated from any acoustic excitation within the operating bandwidth resulting from the controlled motion of the SPM probe.

* * * * *